(12) United States Patent
Bouraoui et al.

(10) Patent No.: US 6,401,184 B1
(45) Date of Patent: Jun. 4, 2002

(54) PROCESS FOR LOCATING PHYSICAL ADDRESSES IN A NONUNIFORM ACCESS MEMORY AND COMPUTER SYSTEM FOR IMPLEMENTING THE PROCESS

(75) Inventors: Nadia Bouraoui; Jean-Pascal Mazzilli, both of Eybens (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/427,002

(22) Filed: Oct. 26, 1999

(30) Foreign Application Priority Data

Oct. 30, 1998 (FR) .............................. 98 13639

(51) Int. Cl.$^7$ .............................. G06F 12/02
(52) U.S. Cl. ...................... 711/202; 711/205
(58) Field of Search .................. 711/202, 205, 711/206, 207

(56) References Cited

U.S. PATENT DOCUMENTS 5,584,004 A   12/1996  Aimoto et al.
5,784,706 A   7/1998   Fromm et al.

FOREIGN PATENT DOCUMENTS

| EP | 0 780 770 A | 6/1997 |
| EP | 0 817 059 A | 1/1998 |

*Primary Examiner*—Hiep T. Nguyen
(74) *Attorney, Agent, or Firm*—Miles & Stockbridge P.C.; Edward J. Kondracki

(57) ABSTRACT

A computer system comprises a nonuniform access memory distributed in several places of residence. The memory accesses a physical resource of the memory at a physical address constituted by a field of i bits and a field of j bits. The memory comprises a table with a number of rows equal to a power (i−j) of two, each row being accessible by a field of (i−k) bits of the physical address containing an identifier of the place of residence of the resource. The process for identifying a place of residence of a physical memory resource thereof consists of simply reading the identifier in the row of the table referenced by the field of (i−k) bits.

12 Claims, 3 Drawing Sheets

PROCESS FOR LOCATING PHYSICAL ADDRESSES IN A NONUNIFORM ACCESS MEMORY AND COMPUTER SYSTEM FOR IMPLEMENTING THE PROCESS

FIELD OF THE INVENTION

The field of application of the invention is that of data processing machines with nonuniform access memory.

DESCRIPTION OF RELATED ART

A memory has nonuniform access when the time interval between the instant at which a request for access to a resource of the memory is sent and the instant at which a response is received varies depending on the location of the resource in the memory. This time interval is called access latency.

One advantage offered by a machine or computer system with nonuniform access memory is the ability to allocate resources in a physical memory of large size to processes executed by the computer system, using a single operating system.

The operating system of the computer manages the physical memory by means of physical addresses in a physical address space. The physical address space is generally subdivided into physical pages of predetermined size. The operating system gives processes access to a virtual address space constituted by segments containing virtual pages that are identical in size to the physical pages. The operating system takes care of mapping each virtual page actually used by a process with a physical page of the memory, using a virtual memory manager.

Virtual memory managers are known within the framework of computers with uniform access memory, in which the location of a physical page, for mapping purposes, does not have any effect on the access latency.

A problem arises in using a known virtual memory manager within the framework of data processing systems with nonuniform access memory in a high-performance manner. In essence, is preferable for a physical page mapped with a virtual page for a given process, insofar as possible, to be a physical page with minimal access latency for the process in question.

It is therefore necessary to be able to locate logical page numbers, or more generally physical addresses, in the nonuniform access memory.

Before the startup of the operating system of the computer, a range of contiguous physical addresses of the physical address space is assigned to each set of resources at the same location in the physical memory.

In order to locate a physical address, a first solution that presents itself consists of comparing the physical address to each address range until the address range that contains it is found, and of thus deducing its location. At best, the first comparison is enough, but at worst, the result is obtained only after comparison with all of the address ranges. Moreover, a comparison with a high-latency address range slows down the obtainment of the result. The process of this first solution is not satisfactory because of the risk that the duration of its implementation will diminish the performance of the machine.

In order to locate a physical address, a second solution that presents itself consists of dividing the value of the physical address by the size of a set of resources. The result provides a resource set order from which it is possible to deduce the location. The process of this second solution is only applicable if all of the resource sets have the same size.

SUMMARY OF THE INVENTION

The subject of the invention is a process that makes it possible to rapidly locate a physical address, no matter what the size of the resource sets at the same location.

According to the invent ion, the process identifies the place of residence of a physical memory resource with a physical address AP in a physical address space associated with a nonuniform access memory MP distributed among several places of residence, one of which is that of said resource. The process comprises:

a preparation step that subdivides the physical address space into physical address sub-spaces of identical size, so as to associate with each place of residence a whole number of physical address sub-spaces;

an identification step that recognizes the physical address sub-space to which the physical address belongs and identifies the place of residence of said resource as being that associated with the recognized address sub-space.

BRIEF DESCRIPTION OF THE DRAWINGS

Additional characteristics of a preferred embodiment of the invention appear in the following description in reference to the figures, in which.

DESCRIPTION OF THE PREFERRED EMBODIMENT(S) OR SYSTEM

Figure 1:
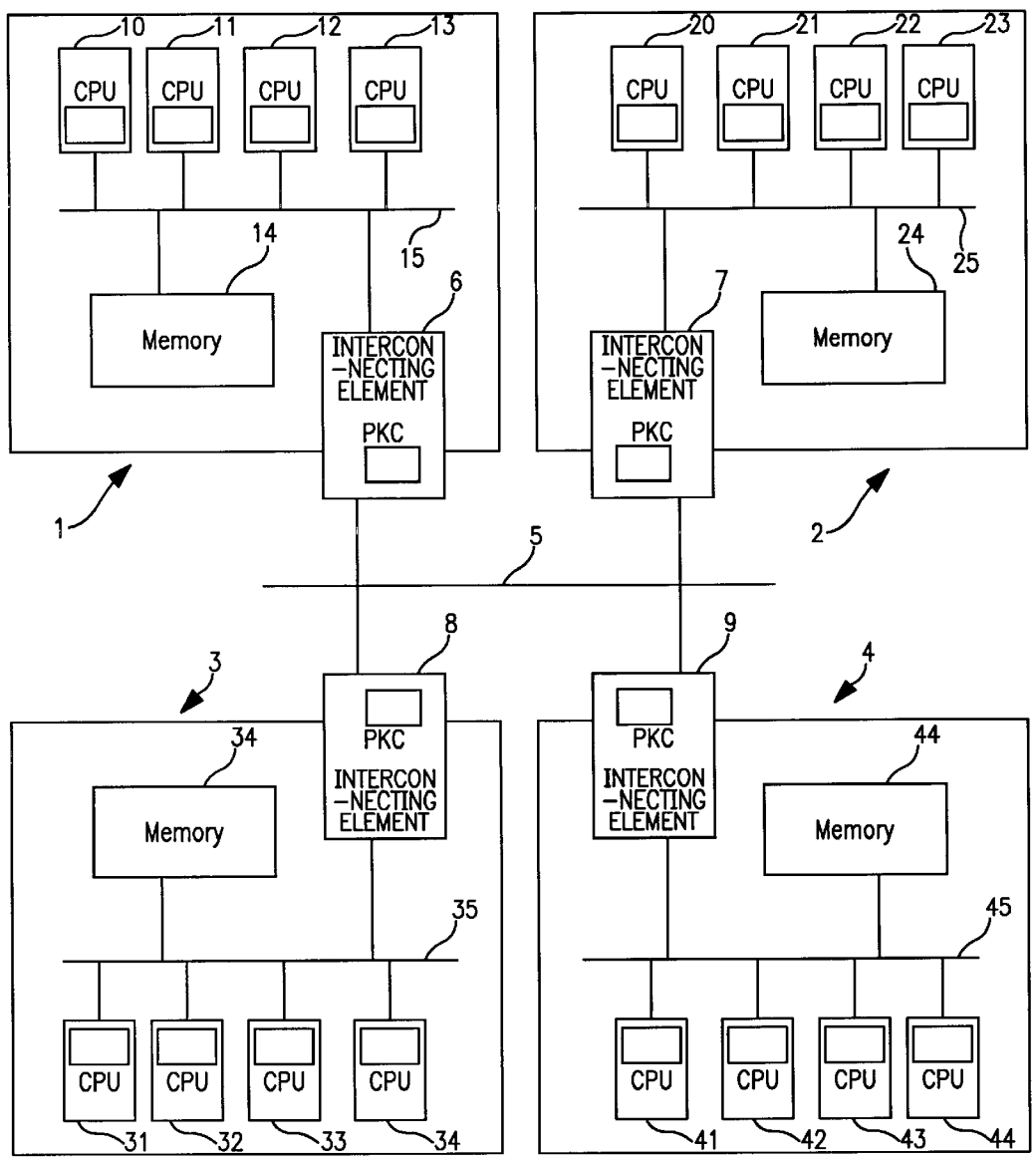
FIG. 1 presents a data processing machine with several modules.

Referring to FIG. 1, a data processing machine comprises a number n of modules run by means of a common operating system OS. A module 1 comprises one or more processors 10, 11, 12, 13 of the central processing unit type CPU and a memory unit 14, local to the module 1. A module 2 comprises one or more processors 20, 21, 22, 23 of the central processing unit type CPU and a memory unit 24, local to the module 2. A module 3 comprises one or more processors 30, 31, 32, 33 of the central processing unit type CPU and a memory unit 34, local to the module 3. A module 4 comprises one or more processors 40, 41, 42, 43 of the central processing unit type CPU and a memory unit 44, local to the module 4. The example presented, in which the number n is equal to 4, is not limiting, either in terms of a lower number or a higher number of modules.

Each module 1, 2, 3, 4 respectively comprises an interconnecting element 6, 7, 8, 9. The interconnecting elements 6, 7, 8, 9 communicate with one another physically by means of a link 5.

A set comprising all or part of the memory unit 14, all or part of the memory unit 24, all or part of the memory unit 34, and all or part of the memory unit 44, constitutes a set of physical memory resources MP for the operating system OS of the machine.

To access a resource in the physical memory MP, a processor 10, 11, 12, 13 located in the module 1 generates an access request through a bus 15, local to the module 1. The access request includes a physical address AP of the resource. Upon detecting the physical address AP in the bus 15, the interconnecting element 6 physically takes control of the bus 15 in order to analyze the physical address AP. If the physical address AP is that of a resource resident in the memory unit 14 and this resource is up-to-date, the interconnecting element 6 leaves it up to the memory unit 14 to transmit the requested resource through the bus 15 in order to respond to the request. If not, the interconnecting element 6 takes care of transmitting the requested resource through the bus 15. If the interconnecting element 6 does not have the requested resource locally, in the module 1, the interconnecting element 6 in turn generates an access request through the link 5. The interconnecting element 7, 8, 9 of the respective remote module 2, 3, 4 that has the requested resource transmits it to the interconnecting element 6.

The hardware mechanism just described is identical for each of the n modules 1, 2, 3, 4 of the machine. The preceding explanations relative to the bus 15 are transposed to a bus 25 for the components of the module 2, to a bus 35 for the components of the module 3, to a bus 45 for the components of the module 4. This hardware mechanism is invisible from the operating system OS, which views all of the physical memory resources MP by means of their physical addresses AP without a priori distinguishing the locality of these resources to a particular module.

However, the time the hardware mechanism takes to respond to an access request generated by a processor local to a module is shorter if the requested resource is available locally in this module than if the requested resource is available in a remote module. That is why the physical memory MP is said to have nonuniform access.

Figure 2:
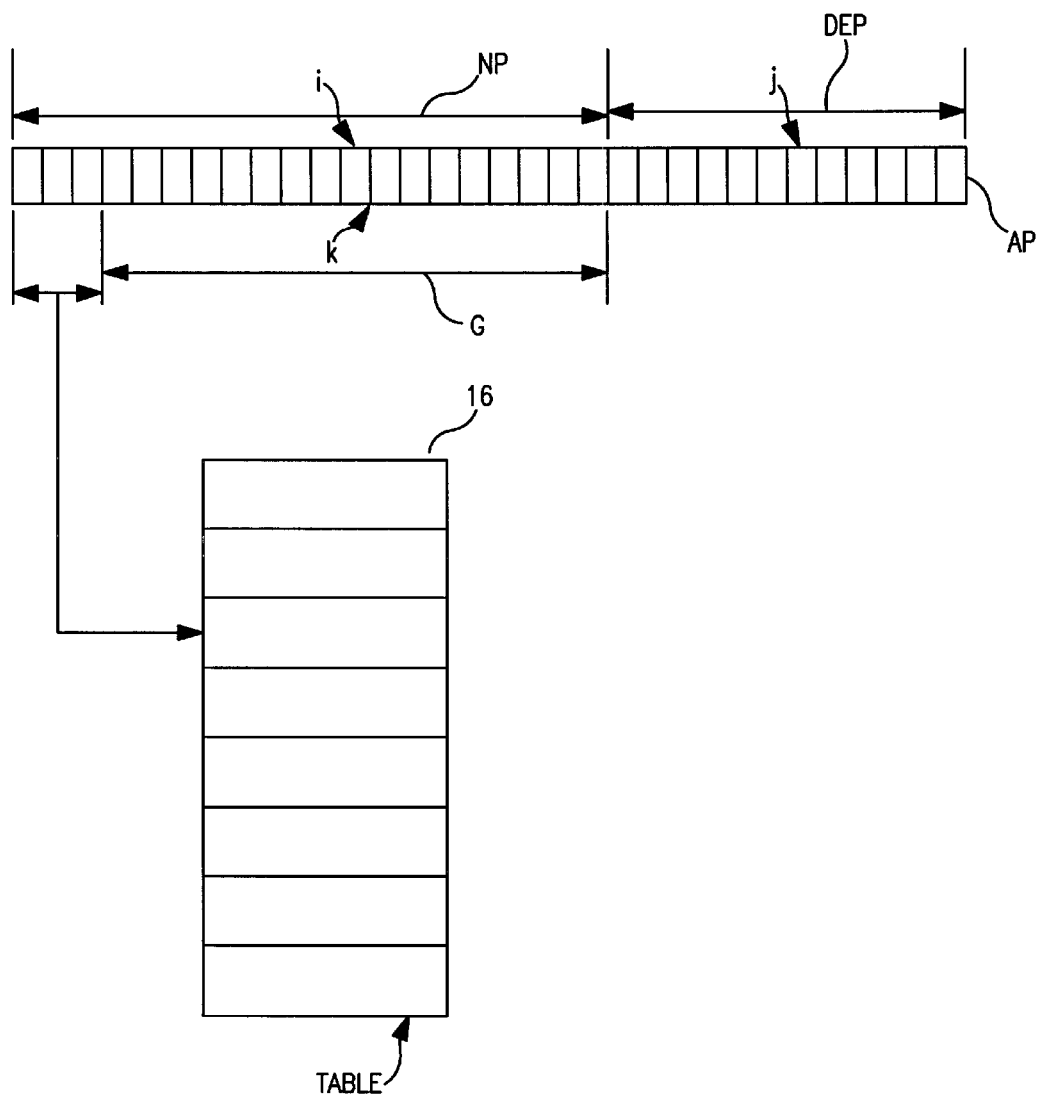
FIG. 2 presents an architecture according to the invention.

Referring to FIG. 2, a physical address AP is normally constituted by two fields, a field NP that codes a physical page number into a number i of bits, for example high-order bits, and a field DEP that codes a shift from the start of a physical page into a number j of bits, for example low-order bits. The power of two of the number j indicates the size of a page, for example a number j equal to twelve indicates a page size of four kilobytes. The power of two of the number i indicates the physical memory size in numbers of pages, for example a number i equal to twenty indicates a number of one physical megapage, or four gigabytes of physical memory.

Each memory unit 14, 24, 34, 44 respectively contains a number N1, N2, N3, N4 of physical pages of the memory MP, normally equal to a power of two. The physical page numbers from zero to the number N1 minus one are allocated to the memory unit 14, the physical page numbers from the number N1 to the number N2 minus one are allocated to the memory unit 24, the physical page numbers from the number N2 to the number N3 minus one are allocated to the memory unit 34, the physical page numbers from the number N3 to the number N4 minus one are allocated to the memory unit 44. This page number allocation is done by configuring the memory units 14, 24, 34, 44 and the connecting elements 6 through 9 before starting the operating system OS. Thus, the, hardware mechanism described above recognizes the memory unit in which the requested resource resides by decoding the field NP of the physical address AP.

According to the invention, the field NP comprises a subfield G with a number k of high-order bits similar to that of the field DEP. The power of two of the number k indicates the size of a physical grain in numbers of physical pages. The size of a physical grain is chosen so that the memory MP contains for each memory unit 14, 24, 34, 44 a number Q1, Q2, Q3, Q4 of physical grains, of which the number N1, N2, N3, N4 of respective physical pages is a multiple.

A table 16 comprises as: many rows as the physical memory MP contains physical grains. The number of rows of the table 16 is equal to the sum of the n numbers Q1 through Q4. The Q1 first rows of the table 16 each contain a number that identifies the module 1. The Q2 next rows of the table 16 each contain a number that identifies the module 2. The Q3 next rows of the table 16 each contain a number that identifies the module 3. The Q4 next rows of the table 16 each contain a number that identifies the module 4.

The value of the i minus k remaining bits of the field NP binary-codes a row number of the table 16. Likewise, a simple reading of the i minus k high-order bits of an address AP gives direct access to one of the entries of the table 16. For a page number between zero and the number N1 minus 1, one of the Q1 first rows of the table 16 is accessed, and the reading of this row gives the number that identifies the module 1 directly, without any other calculation. For a page number between the number N1 and the number N2 minus one, one of the Q2 next rows of the table 16 is accessed, and the reading of this row gives the number that identifies the module 2 directly, without any other calculation. For a page number between the number N2 and the number N3 minus one, one of the Q3 next rows of the table 16 is accessed, and the reading of this row gives the number that identifies the module 3 directly, without any other calculation. For a page number between the number N3 and the number N4 minus one, one of the Q4 next rows of the table 16 is accessed, and the reading of this row gives the number that identifies the module 4 directly, without any other calculation.

Taking as the value of the physical grain size a number equal to the greatest common divisor PGCD of the numbers N1, N2, N3, N4 of physical pages, the number of rows of the table 16 is reduced to the minimum, since Q1 is equal to the number N1 divided by the number PGCD, Q2 is equal to the number N2 divided by the number PGCD, Q3 is equal to the number N3 divided by the number PGCD, and Q4 is equal to the number N4 divided by the number PGCD. A duplication of the table 16 in each of the modules 1, 2, 3, 4 reserves only a limited number of resources. The duplication makes it possible to rapidly identify the module of residence of a physical address AP without requiring any remote access.

Thus, a process running, for example, in the module 1 is capable of immediately identifying the module number to which an address AP belongs, by accessing the duplication of the table 16 resident in the module 1.

Figure 3:
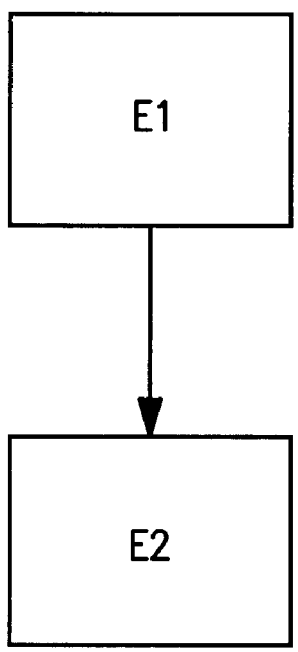
FIG. 3 presents a process according to the invention.

A two-step process is defined in reference to FIG. 3. A preparation step E1 and an identification step E2 may be distinguished. The purpose of step E1 is to prepare a data architecture, which is then used in step E2. Step E2 is repeated each time it is necessary to identify the place of residence of a physical address AP or of a physical page number NP.

In step E1, a physical address sub-space size G, in numbers of physical pages, is defined from the numbers N1, N2, N3, N4 of pages in each module. The size G is defined so that each module contains a whole number of physical address sub-spaces. The size G is therefore a divisor of each of the numbers N1, N2, N3, N4. Thus each place of residence 1, 2, 3, 4 respectively contains a number N1/G, N2/G, N3/G, N4/G of physical address sub-spaces. Thus, the preparation step E1 subdivides the physical address space into physical address sub-spaces of identical size G, in order to associate with each place of residence 1, 2, 3, 4, respectively, a whole number of physical address sub-spaces N1/G, N2/G, N3/G, N4/G. A place-of-residence identifier is assigned to each accumulated sum of the numbers of sub-spaces, starting with zero. Thus, a null number is assigned an identifier of the module 1, a number equal to N1/CG is assigned an identifier of the module 2, a number equal to [N1+N2]/G is assigned an identifier of the module 3, a number equal to [N1+N2+N3]/G is assigned an identifier of the module 4.

Each time a process needs to identify the place of residence of an address AP, the process executes step E2. In step E2, the value of the field NP of the address AP is divided by the size G defined. The identifier of the place of residence is the one assigned to the greatest accumulated sum that is less than the result of the division. Thus a result between zero and N1/G identifies the module 1, a result between [N1C/G and [N1+N2]/G identifies the module 2, a result between [N1+N2]/G and [N1+N2+N3]/G identifies the module 3, and a result between N1+N2+N3]/G and [N1+N2+N3+N4]/G identifies the module 4.

In step E1, expressing the size G in the form of a power k of two, it constitutes a field of the physical address AP of k bits in the field NP of i bits. The remaining field of i minus k bits then makes it possible to number each physical address sub-space. The table 16 is created with one row for each physical address sub-space number. The identifier of the module 1 is written in the N1/G first rows. The identifier of the module 2 is written in the N2/G next rows. The identifier of the module 3 is written in the N3/G next rows. The identifier of the module 4 is written in the N4/G next rows.

In step E2, the division is performed simply by reading the physical address sub-space number contained in the remaining field of i minus k bits of the field NP. This physical address sub-space number directly references the corresponding row of the table 16 that gives the identifier of the place of residence of the resource addressed by the address AP.

A physical address sub-space size G equal to the greatest common divisor PGCD of the numbers of physical pages N1, N2, N3, N4 in each place of residence makes it possible to optimize the number of physical address sub-spaces so as to reduce the number of rows of the table 16.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. Process for identifying a place of residence of a physical memory resource with a physical address (AP) in a physical address space associated with a nonuniform access memory (MP) distributed among several places of residence, one of which is that of said resource, said process comprising:

subdividing, in a preparation step (E1), the physical address space into physical address sub-spaces of identical size, so as to associate with each place of residence a whole number of physical address sub-spaces;

numbering the physical address sub-spaces;

recognizing in an identification step (E2), a physical address sub-space number to which the physical address (AP) belongs; and identifying the place of residence of said resource as being that associated with the recognized address sub-space number.

2. Process according to claim 1, wherein said recognizing step includes dividing the physical address by a value which corresponds to said identical size, and wherein said identifying step is performed based on an outcome of said dividing step.

3. Process according to claim 1, wherein said physical address sub-spaces have no overlapping physical addresses.

4. Process according to claim 2, further comprising:

storing a table in each of the places of residence, each table correlating physical addresses in a respective one of the places of residence with identifiers, wherein the physical address (AP) includes bits corresponding to one of said identifiers.

5. Process according to claim 4, further comprising:

determining a physical address in the place of residence corresponding to said resource based on the bits in said physical address corresponding to said one of said identifiers.

6. Process for identifying a place of residence of a physical memory resource with a physical address (AP) in a physical address space associated with a nonuniform access memory (MP) distributed among several places of residence, one of which is that of said resource, said process comprising:

subdividing, in a preparation step (E1), the physical address space into physical address sub-spaces of identical size, so as to associate with each place of residence a whole number of physical address sub-spaces;

recognizing, in an identification step (E2), a physical address sub-space to which the physical address (AP) belongs; and identifying the place of residence of said resource as being that associated with the recognized address sub-space, said process further comprising:

defining, in step (E1), a field of the physical address (AP) for numbering each physical address sub-space, creating a table with one row for each physical address sub-space number, and in each row corresponding to a given physical address sub-space number, writing an identifier of the place of residence associated with the given physical address sub-space; and reading, in step (E2), a row of the table corresponding to the physical address sub-space number contained in the defined field of the physical address, and identifying the place of residence of the resource addressed by the address (AP).

7. Process for identifying a place of residence of a physical memory resource with a physical address (AP) in a physical address space associated with a nonuniform access memory (MP) distributed among several places of residence, one of which is that of said resource, said process comprising:

subdividing, in, a preparation step (E1), the physical address space into physical address sub-spaces of identical size, so as to associate with each place of residence a whole number of physical address sub-spaces;

recognizing, in an identification step (E2), a physical address sub-space to which the physical address (AP) belongs; and identifying the place of residence of said resource as being that associated with the recognized address sub-space, said process further comprising:

defining, in step (E1), a physical address sub-space size (G) and a number of physical address sub-spaces per place of residence, and assigning a place-of-residence identifier to each accumulated sum of the numbers of sub-spaces, starting with zero; and in step (E2), dividing the value of the address (AP) by the size (G) defined, the identifier of the place of residence being the one assigned to the greatest accumulated sum that is less than the result of the division.

8. Process or identifying a place of residence of a physical memory resource with a physical address (AP) in a physical address space associated with a nonuniform access memory (MP) distributed among several places of residence, one of which is that of said resource, said process comprising:

subdividing, in a preparation step (E1), the physical address space into physical address sub-spaces of identical size, so as to associate with each place of residence a whole number of physical address sub spaces;

recognizing, in an identification step (E2), a physical address sub-space to which the physical address (AP) belongs; and identifying the place of residence of said resource as being that associated with the recognized address sub-space, wherein the physical address sub-space size is equal to the greatest common divisor (PGCD) of the numbers of physical pages in each place of residence.

9. Process according to claim 6, characterized in that the physical address sub-space size is equal to the greatest common divisor PGCD of the numbers of physical pages in each place of residence.

10. Process according to claim 7, characterized in that the physical address sub-space size is equal to the greatest common divisor PGCD of the numbers of physical pages in each place of residence.

11. A computer system comprising a nonuniform access memory (MP) distributed in several places of residence (1, 2, 3, 4) and means for accessing a physical resource of the memory (MP) through a physical address (AP), said memory including a table (16) comprising a number of rows equal to a power (i−k) of two, each row being accessible by means of a field of (i−k) bits of the physical address (AP), the row accessed by means of the field of (i−k) bits of the physical address (AP) containing an identifier of the place of residence of said resource.

12. A computer system according to claim 11, characterized in that the table (16) contains, for each place of residence, a number of rows equal to a quotient whose numerator is the number of physical pages of the place of residence and whose denominator is the number of physical pages that can be referenced by a field of (k) bits of the physical address (AP).

* * * * *